(12) United States Patent
Sotoyama et al.

(10) Patent No.: US 8,636,093 B2
(45) Date of Patent: Jan. 28, 2014

(54) VEHICLE BODY LOWER PORTION STRUCTURE

(75) Inventors: Yoshitaka Sotoyama, Nlsshin (JP); Koki Ikeda, Toyota (JP); Shigeru Inamori, Nagoya (JP); Kazuhiro Seki, Miyoshi (JP); Hiroaki Iwamoto, Nagoya (JP); Masahiro Ono, Okazaki (JP); Sho Maeda, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/819,317

(22) PCT Filed: Aug. 30, 2010

(86) PCT No.: PCT/JP2010/064750
§ 371 (c)(1),
(2), (4) Date: Feb. 26, 2013

(87) PCT Pub. No.: WO2012/029115
PCT Pub. Date: Mar. 8, 2012

(65) Prior Publication Data
US 2013/0154308 A1   Jun. 20, 2013

(51) Int. Cl.
*B62D 25/20* (2006.01)
(52) U.S. Cl.
USPC ............... 180/69.1; 296/193.07; 296/204; 180/312
(58) Field of Classification Search
USPC .......... 296/188–189, 203.1–203.2, 187.09, 296/193.09, 204, 193.07; 280/781, 784, 280/788; 180/69.1, 232, 309, 312
See application file for complete search history.

(56) References Cited

U.S. PATENT DOCUMENTS

| 7,823,964 B2* | 11/2010 | Tasumi et al. ............. 296/204 |
| 8,276,980 B2* | 10/2012 | Boettcher et al. ....... 296/193.07 |
| 2003/0034670 A1 | 2/2003 | Adamski |
| 2003/0173134 A1 | 9/2003 | Unfried et al. |
| 2010/0259033 A1 | 10/2010 | Okabe et al. |

FOREIGN PATENT DOCUMENTS

| EP | 2195199 A1 | 6/2010 |
| JP | 51-047316 Y | 11/1974 |
| JP | 58-082968 U | 6/1983 |
| JP | 60-113773 A | 6/1985 |
| JP | 05-246349 A | 9/1993 |
| JP | 2001-500817 A | 1/2001 |
| JP | 2003-081134 A | 3/2003 |
| JP | 2003-267267 A | 9/2003 |
| JP | 2004-359125 A | 12/2004 |

(Continued)

*Primary Examiner* — John Walters
*Assistant Examiner* — James Triggs
(74) *Attorney, Agent, or Firm* — Kenyon & Kenyon LLP (57) ABSTRACT

To obtain a vehicle body lower portion structure that can efficiently absorb and disperse load of a front or rear collision including an offset collision or an oblique collision, and transmit the load to an underbody. A vehicle body lower portion structure has an underbody at which a dash lower portion and a lower back portion are provided to stand from both ends in a vehicle front-rear direction at a floor portion, a suspension member the length direction thereof is along a vehicle transverse direction and is joined to the underbody in a state of planarly-contacting a front surface of the dash lower portion, and a front EA member a length direction thereof is along the vehicle transverse direction and is joined to a front wall of the suspension member.

4 Claims, 9 Drawing Sheets

(56) References Cited

FOREIGN PATENT DOCUMENTS

| | | |
|---|---|---|
| JP | 2005001430 A | 1/2005 |
| JP | 2005-162144 A | 6/2005 |
| JP | 2006-111076 A | 4/2006 |
| JP | 2008-100548 A | 5/2008 |
| JP | 2009-051250 A | 3/2009 |
| JP | 2010158974 A | 7/2010 |
| WO | 99/32346 A1 | 7/1999 |
| WO | 2009116395 A1 | 3/2009 |
| WO | 2010/081997 A2 | 7/2010 |

* cited by examiner

VEHICLE BODY LOWER PORTION STRUCTURE

CROSS-REFERENCE TO RELATED APPLICATIONS

This application is a United States National Stage Patent Application filed under 35 U.S.C. §371, based on International Application Serial No. PCT/JP2010/064750, which was filed on Aug. 30, 2010, the entire contents of which is expressly incorporated herein by reference.

TECHNICAL FIELD

The present invention relates to a vehicle body lower portion structure that has an underbody at which standing walls are provided so as to stand from both ends, in the vehicle longitudinal direction, at a floor portion.

BACKGROUND ART

There is known a lower portion structure of a vehicle front body portion that disperses a load of a front collision, that is inputted to a front side member, to a tunnel member via an inner torque box, and disperses the load to a rocker rail via an outer torque box (see, for example, Japanese Patent Application Laid-Open No. 2005-162144). Further, a vehicle front portion structure is known in which a hollow structural body, whose cross-sectional shape in plan view is lattice-shaped, is disposed for impact absorption between left and right front side members such that dependence on front side members regarding the impact absorption performance at the time of a front collision is lowered (see, for example, Japanese Patent Application Laid-Open No. 2009-51250).

Moreover, there is known a method of manufacturing an automobile in which the vehicle body lower portion frame is divided into front, center and rear portions, and, after assembling functional parts to the respective frames, the entirety thereof are joined (see, for example, Japanese Patent Application Laid-Open No. 5-246349). Further, a vehicle body skeleton structure is known in which a front skeleton module that includes a front suspension and a rear skeleton module that includes a rear suspension are joined (see, for example, Japanese Patent Application Laid-Open No. 2006-111076). Still further, there is known a structure that assembles a radiator tank module, to which an accelerator pedal, a brake pedal and the like are assembled, from an engine room to the vehicle body (see, for example, Japanese Patent Application National Publication No. 2001-500817).

DISCLOSURE OF INVENTION

Technical Subject

In a structure in which a load of a front collision is received at a pair of left and right front side members, it is difficult to efficiently transmit the collision load to a side opposite to the collision, at the time of an offset collision or an oblique collision or the like for example.

A subject of the present invention is to obtain a vehicle body lower portion structure that can efficiently absorb and disperse load of a front collision or a rear collision, that includes offset collisions and oblique collisions, and transmit the load to the underbody.

Solution to Subject

A vehicle body lower portion structure relating to a first aspect of the present invention has: an underbody at which standing walls are provided to stand upward in a vehicle up-down direction from both ends in a vehicle front-rear direction at a floor portion;

a load transmitting member, a length direction thereof being along a vehicle transverse direction and a cross-section thereof orthogonal to the length direction being a closed cross-sectional structure, is joined to the underbody in a state that a flat surface of the load transmitting member planarly-contacting a surface that faces outward in the vehicle front-rear direction of at least one of the standing walls; and an impact absorbing member, a length direction thereof being along the vehicle transverse direction, is formed in a box shape and opens toward a load transmitting member side and is closed at an opposite side in the vehicle front-rear direction to the load transmitting member side, the impact absorbing member is joined, at a flange that projects-out from an open end thereof, in a planarly-contacting state to a flat surface at an opposite side in the vehicle front-rear direction to an underbody side of the load transmitting member.

Here, because the length directions of both the impact absorbing member and the load transmitting member are along the vehicle transverse direction, at the time of absorbing impact (collision energy), the impact absorbing member does not give rise to a deformation mode in which the impact absorbing member folds-over in the front-rear direction, and the impact absorbing member is compressed stably in the front-rear direction (the axial compression is stable). Moreover, the load transmitting member is in a state of planarly-contacting or, along the vehicle transverse direction, linearly-contacting the standing wall of the underbody. Therefore, the collision load is efficiently dispersed in the vehicle transverse direction and is inputted to the underbody, regardless of an input position in the vehicle transverse direction or the input angle of the collision load.

In this way, in the vehicle body lower portion structure relating to the above-described aspect, the load of a front or rear collision, including an offset collision or an oblique collision, can be efficiently absorbed and dispersed, and transmitted to the underbody.

In the above-described aspect, there may be a structure in which at least a portion of the load transmitting member is structured by a suspension supporting member that supports, at outer end sides in the vehicle transverse direction thereof, at least portions of suspension devices that suspend wheels.

In accordance with the above-described aspect, the load transmitting member that supports at least portions of the suspension devices is made to be highly rigid in light of the function thereof. Because the load transmitting member that is a highly-rigid member in this way is joined to the underbody, the collision load can be transmitted efficiently to an underbody side. Further, the rigidity of the underbody itself can be improved (the underbody can be reinforced) by the joining of the load transmitting member.

In the above-described aspect, there may be a structure in which the load transmitting member is the suspension supporting member that is structured so as to be able to be mounted to the underbody while supporting the suspension devices as entireties.

In accordance with the above-described aspect, the suspension devices are supported as entireties by the suspension supporting member that is the load transmitting member. In other words, the suspension devices are supported at the load transmitting member so as to be able to function independently of the other vehicle body structural members. Therefore, the assembly accuracy of the suspension improves. Further, the work at the time of assembling the suspension to the vehicle body is easy.

In the above-described aspect, there may be a structure in which a front-rear direction frame portion, a length direction thereof being along the vehicle front-rear direction, is formed at a floor portion of the underbody; a closed cross-sectional portion, a length direction thereof being along the vehicle transverse direction and forming a closed cross-section as seen from the vehicle transverse direction, is provided at least at a lower end side in the vehicle up-down direction of the standing wall at the underbody, the closed cross-sectional portion is connected to the front-rear direction frame portion at an end portion of the front-rear direction frame portion at a side where, in the vehicle front-rear direction; the load transmitting member and the impact absorbing member are provided; the impact absorbing member is disposed so as to be offset toward an upper side in the vehicle vertical direction with respect to the front-rear direction frame portion; and at least one of the closed cross-sectional portion and the load transmitting member has an inclined portion that is inclined such that a lower side thereof in the vehicle up-down direction is positioned at a front-rear direction frame portion side in the vehicle front-rear direction than an upper side of the inclined portion.

In accordance with the above-described aspect, the load, that is transmitted from the impact absorbing member to the standing wall via the load transmitting member, is, at the underbody, transmitted to the front-rear frame portion via the closed cross-sectional portion that is formed at the lower end side of the standing wall. The impact absorbing member is offset upwardly with respect to the front-rear frame portion, and load is transmitted well to the front-rear frame portion side from the impact absorbing member side, that are offset in the up-down direction, by the inclined portion of the load transmitting member and/or the closed cross-sectional portion.

Advantageous Effects of Invention

As described above, the vehicle body lower portion structure relating to the present invention has the excellent effect of being able to efficiently absorb and disperse the load of a front or rear collision, that includes an offset collision or an oblique collision, and transmit the load to the underbody.

BEST MODES FOR CARRYING OUT THE INVENTION

A vehicle body lower portion structure 10 relating to an embodiment of the present invention is described on the basis of FIG. 1 through FIG. 5. Note that arrow FR shown appropriately in the drawings indicates the forward direction in the vehicle front-rear direction, arrow UP indicates the upward direction in the vehicle up-down direction, and arrow W indicates the vehicle transverse direction, respectively. In the following description, unless specially noted, when front/rear and up/down are used, they indicate front/rear direction in the vehicle front-rear direction and up/down direction in the vehicle up-down direction.

Figure 1:
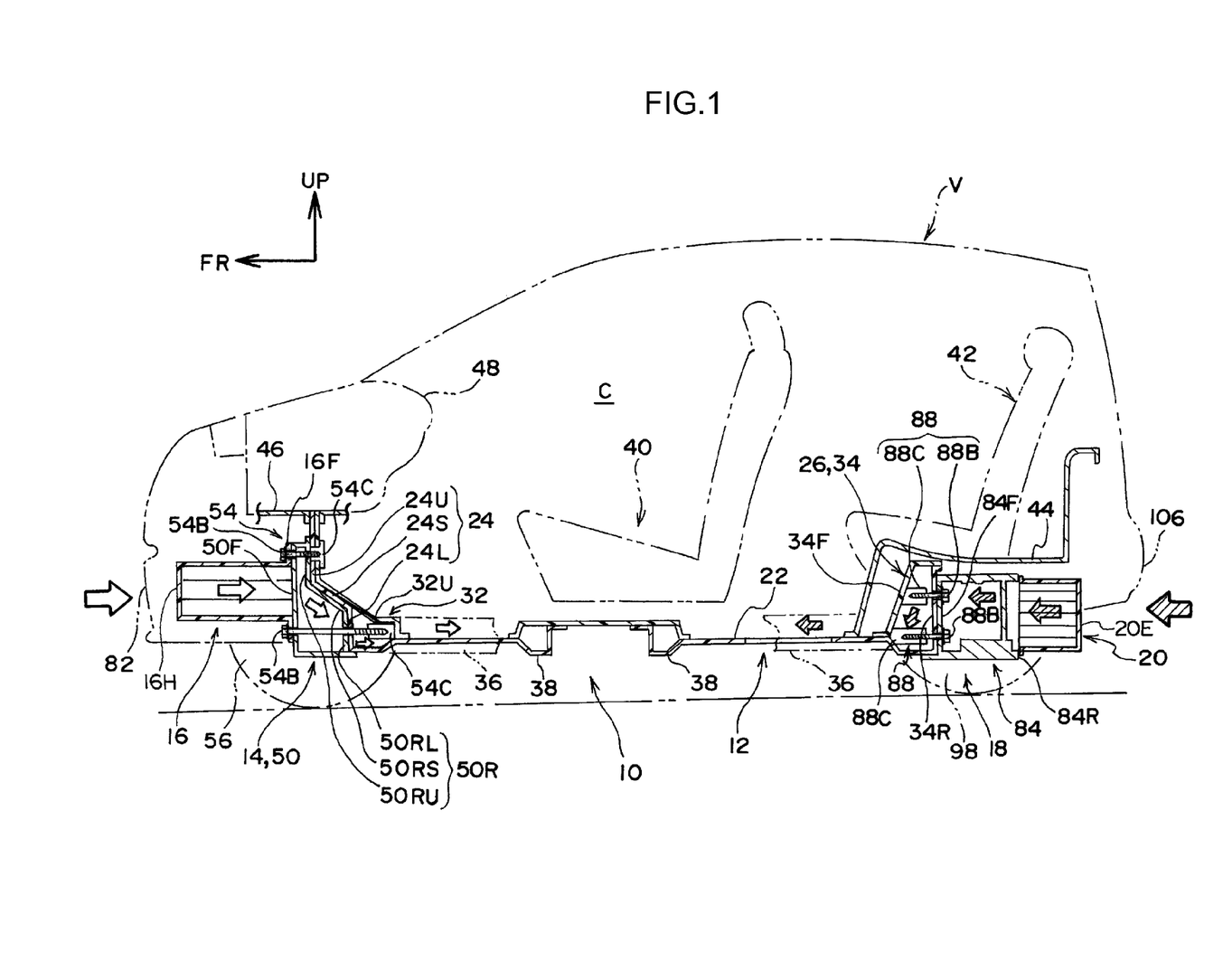
FIG. 1 is a side sectional view showing a vehicle body lower portion structure relating to an embodiment of the present invention.
Figure 2:
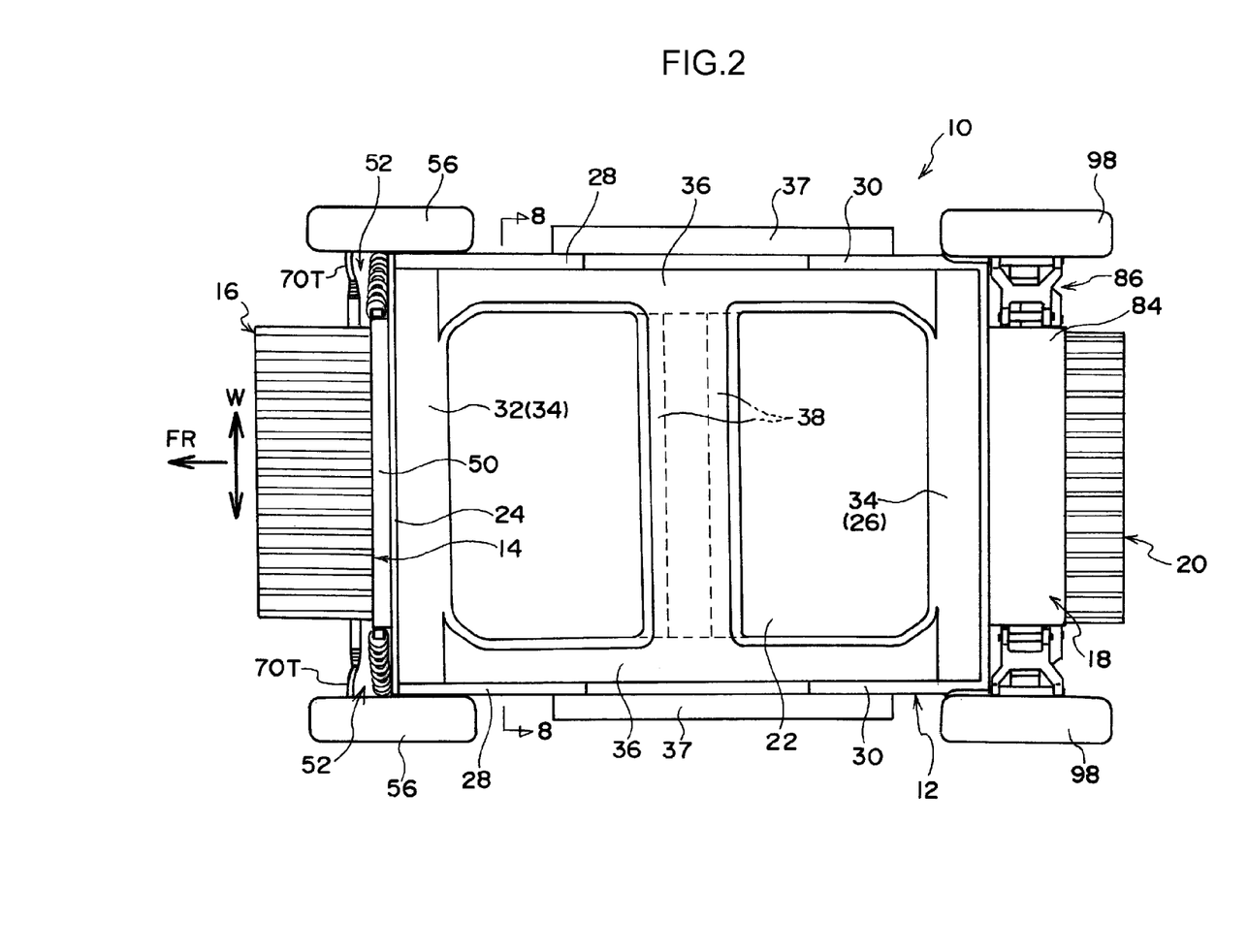
FIG. 2 is a plan view showing the vehicle body lower portion structure relating to the embodiment of the present invention.
Figure 3:
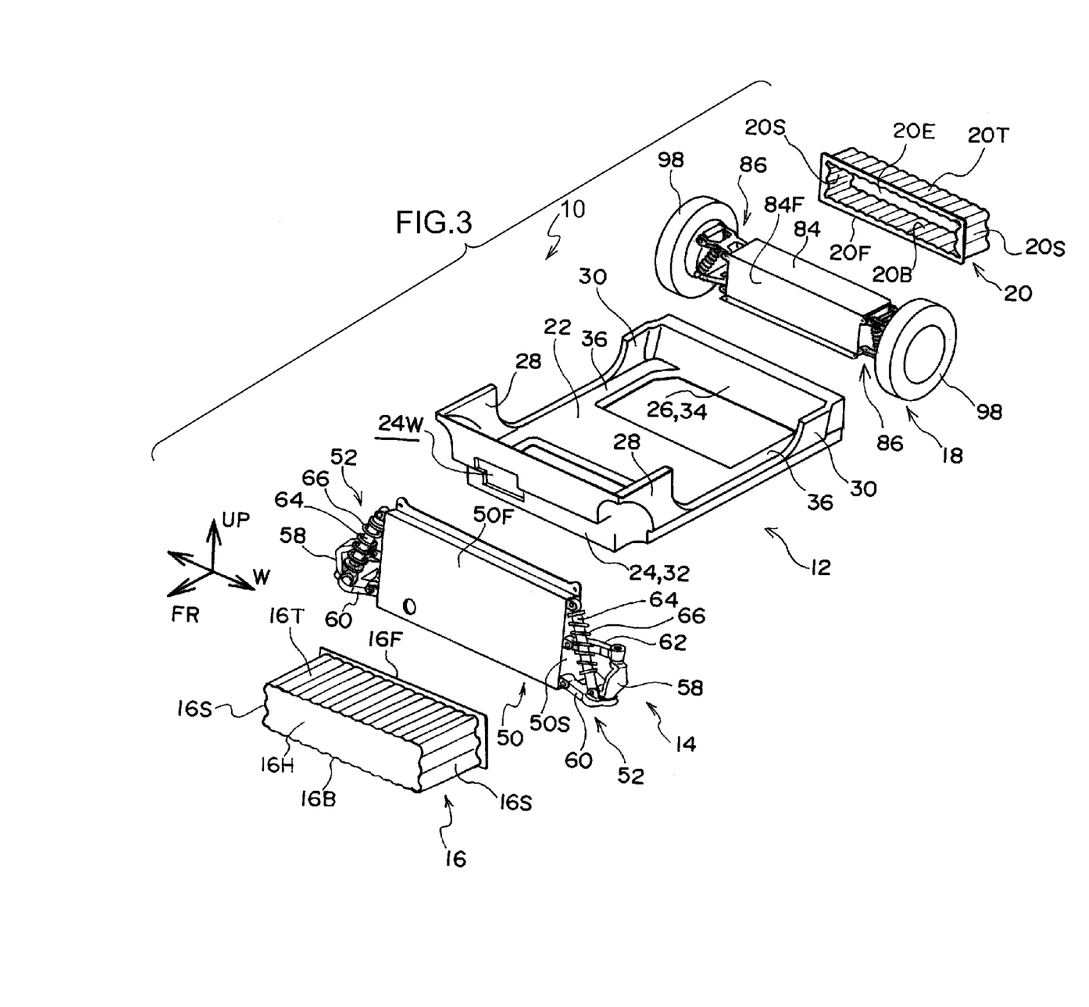
FIG. 3 is an exploded perspective view of the vehicle body lower portion structure relating to the embodiment of the present invention.

An automobile V to which the vehicle body lower portion structure 10 is applied is shown in FIG. 1 in a side sectional view. Further, the vehicle body lower portion structure 10 is shown in FIG. 2 in a plan view. An exploded perspective view of the vehicle body lower portion structure 10 is shown in FIG. 3. As shown in these drawings, the vehicle body lower portion structure 10 is structured with main portions thereof being an underbody 12, a front suspension module 14, a front energy absorbing member (hereinafter called "front EA member") 16, a rear suspension module 18, and a rear energy absorbing member (hereinafter called "rear EA member") 20.

(Structure of Underbody)

The underbody 12 is structured to include a floor portion 22 that is formed in a substantially rectangular shape in plan view, a dash lower portion 24 that serves as a standing wall that is provided so as to stand upward from a front end of the floor portion 22, and a lower back portion 26 that serves as a standing wall that is provided so as to stand upward from a rear end of the floor portion 22. The dash lower portion 24 and the lower back portion 26 have lengths that extend over substantially the entire width of the floor portion 22, and, in front view, are formed in substantially rectangular shapes that are long in the vehicle transverse direction.

Front side walls 28 extend rearward from both ends in the vehicle transverse direction of the dash lower portion 24, and rear side walls 30 extend forward from both ends in the vehicle transverse direction of the lower back portion 26. Respective lower ends of the front side walls 28 and the rear side walls 30 are continuous with outer end portions in the vehicle transverse direction of the floor portion 22, and are separated from each other in the front-rear direction.

Due to the above, the underbody 12 is formed overall in a bathtub shape (the shape of a bathtub at which portions of the side walls have been cut-out) as shown in FIG. 3. As shown in FIG. 1, the dash lower portion 24 is configured to have a stepped portion 24S at a central portion in the up-down direction, such that an upper portion 24U is positioned further forward than a lower portion 24L. The stepped portion 24S is an inclined wall that serves as an inclined portion that is sloped such that a lower portion thereof is positioned further rearward than an upper portion.

Further, a front cross portion 32, that serves as a closed cross-sectional portion that has a closed cross-sectional structure and is extend in the vehicle transverse direction, is formed at the lower portion 24L of the dash lower portion 24. A front portion of an upper wall 32U of the front cross portion 32 is an inclined wall that serves as an inclined portion that is sloped so as to be continuous with the stepped portion 24S that is an inclined wall in side sectional view. Moreover, a rear cross portion 34, that serves as a closed cross-sectional portion that has a closed cross-sectional structure and is extended in the vehicle transverse direction, is formed at the lower back portion 26. A front wall 34F of the rear cross portion 34 is an inclined wall that serves as an inclined portion that is sloped such that a lower portion thereof is positioned further toward the front side than un upper portion. A rear wall 34R of the rear cross portion 34 is a flat wall that substantially runs along the up-down direction as seen in side sectional view.

Figure 8:
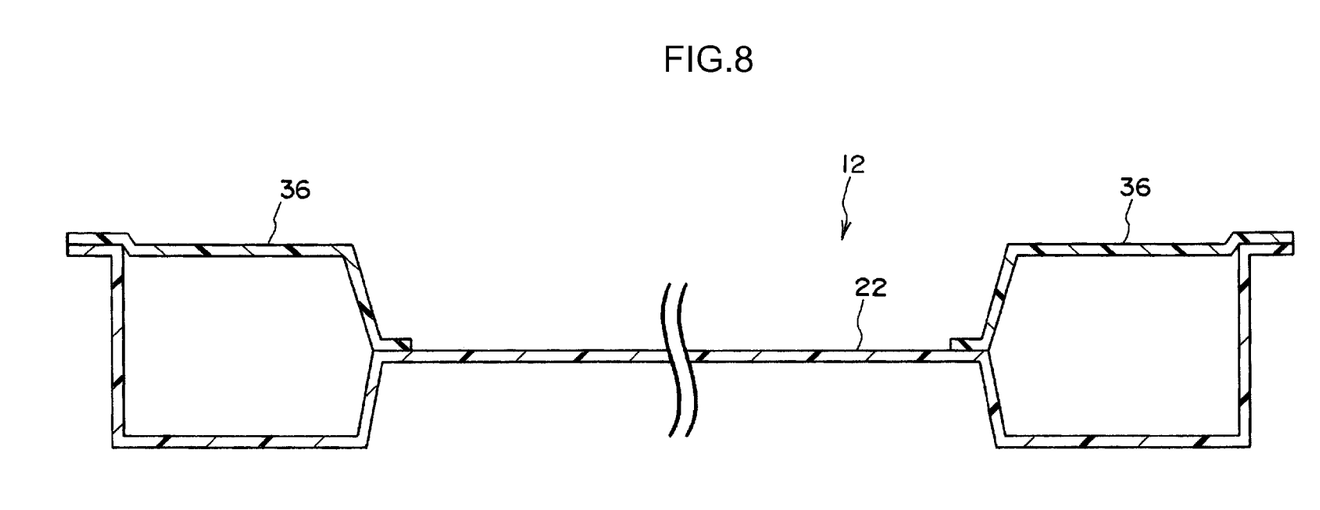
FIG. 8 is a cross-sectional view along line 8-8 of FIG. 2.

As shown in FIG. 2, the front cross portion 32 and the rear cross portion 34, each has a length that extends over substantially the entire length in the length direction of the dash lower portion 24, the lower back portion 26, respectively. Respective end portions in the vehicle transverse direction of the front cross portion 32 and the rear cross portion 34 are connected to rockers 36 that serve as front-rear frame portions. As shown in FIG. 8 that is a cross-sectional view along line 8-8 of FIG. 2, a pair of left and right rockers 36 extends in the front-rear direction and, at the end portions in the vehicle transverse direction of the floor portion 22, structure frame portions that have closed cross-sectional structures. Impact absorbing members 37 for a side collision are fixed to outer sides in the vehicle transverse direction of the left and right rockers 36. Although not illustrated, the impact absorbing members 37 are formed, in side view, in wavy plate shapes in which mountains and valleys are continuous alternately in the front-rear direction.

Further, as shown in FIG. 1 and FIG. 2, center cross portions 38 that span between the left and right rockers 36 are formed at a substantially central portion in the front-rear direction of the floor portion 22. In this embodiment, a pair of the front and back center cross portions 38 are formed. As shown in FIG. 1, at the automobile V, there is a structure in which front seats 40 are disposed on the front and rear center cross portions 38. Further, at the automobile V, there is a structure in which a rear seat 42 is disposed on the rear cross portion 34. The rear seat 42 is mounted onto a rear cross panel 44 that is provided so as to cover the rear cross portion 34 from the front side and the upper side. Moreover, a dash upper portion 46 and an instrument panel 48 are connected to the upper portion 24U of the dash lower portion 24.

The above-described underbody 12 is structured of a resin material. A fiber-reinforced resin that contains reinforcing fibers such as, for example, carbon fibers, glass fibers, aramid fibers or the like, may be used as the resin material that structures the underbody 12.

(Structure of Front Suspension Module)

The front suspension module 14 is structured to include at least a suspension member 50 and a pair of left and right front suspension units 52. As shown in FIG. 2 and FIG. 3, the suspension member 50 that serves as a suspension supporting member and a length direction thereof is along the vehicle transverse direction, and, as shown in FIG. 1, a cross-section thereof orthogonal to the length direction is a closed cross-sectional structure. A rear wall 50R, that faces toward the rear side, at the suspension member 50 is a stepped wall that corresponds to the upper portion 24U, the lower portion 24L, the stepped portion 24S of the dash lower portion 24.

The suspension member 50 is fixed to the underbody 12 in a state in which an upper portion 50RU, a lower portion 50RL, a stepped portion 50RS of the rear wall 50R respectively planarly-contact (are set face-to-face to) the upper portion 24U, the lower portion 24L, the stepped portion 24S of the dash lower portion 24. For example, fastening structures 54 in which bolts 54B are screwed from a suspension member 50 side with nut portions that are formed at collars 54C that are made of metal and are provided at the dash lower portion 24, are employed as the fixing structure thereof. In this embodiment, the fastening structures 54 also fasten together a flange 16F (to be described later) of the front EA member 16. A front wall 50F, that faces toward the front side, at the suspension member 50, is a flat wall that substantially runs along the up-down direction as seen in side sectional view. Note that, in FIG. 4, FIG. 5 and the like, illustration of through-holes of the front wall 50F, which are for passing-through of the bolts 54B, is omitted.

Figure 4:
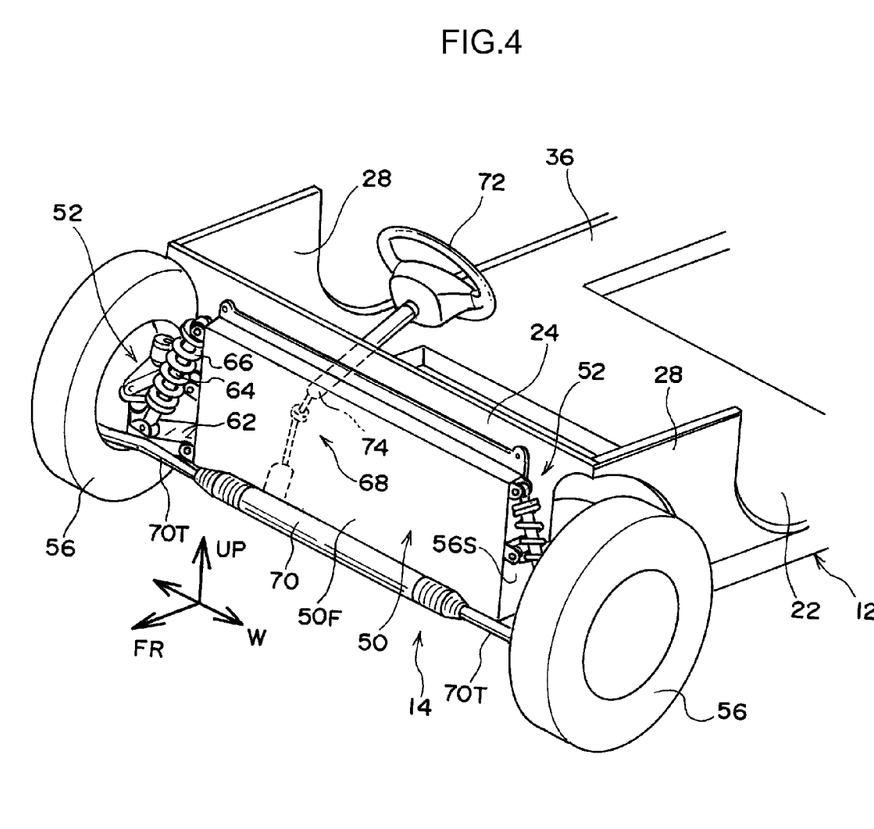
FIG. 4 is a perspective view showing, in an enlarged manner, a front portion of the vehicle body lower portion structure relating to the embodiment of the present invention.
Figure 5:
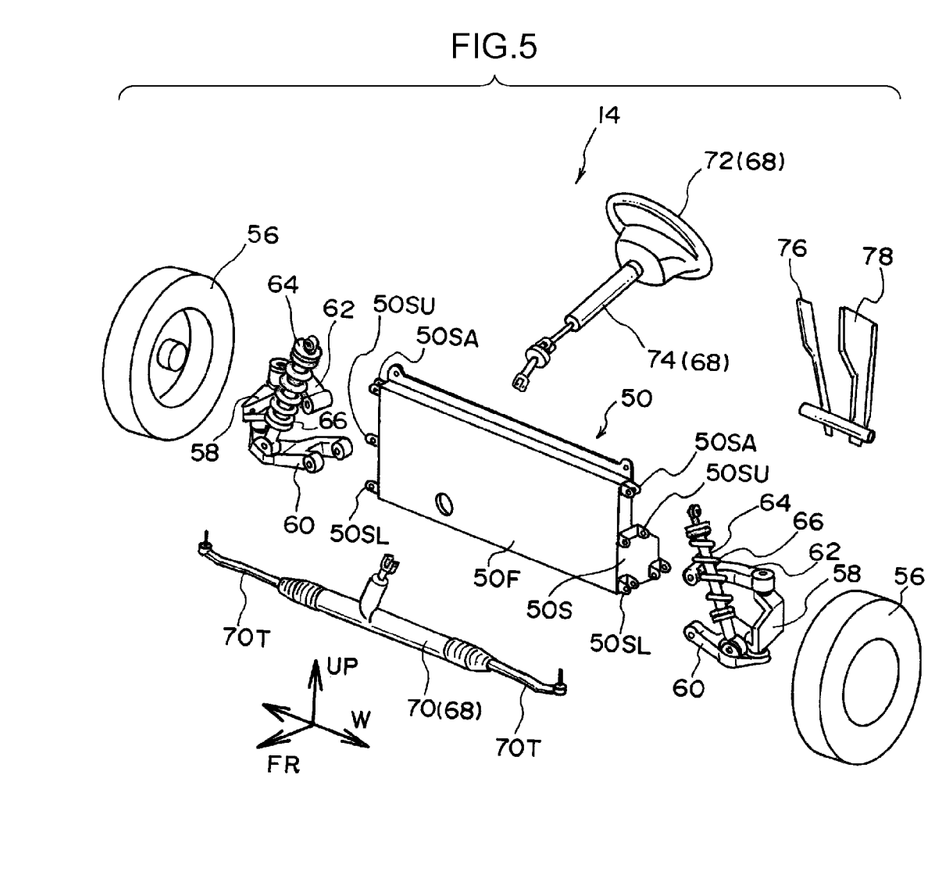
FIG. 5 is an exploded perspective view of a front suspension module that structures the vehicle body lower portion structure relating to the embodiment of the present invention.

As shown in FIG. 4 and FIG. 5, the front suspension units 52 that serve as suspension devices are mounted to side walls 50S of the suspension member 50. The front suspension unit 52 is structured with main portions thereof being a steering knuckle 58, a lower arm 60, an upper arm 62, a shock absorber 64, and a compression coil spring 66. In FIG. 3, illustration of front wheels 56 is omitted.

The steering knuckle 58 supports the front wheel 56, which is a wheel, so as to rotate freely. The lower arm 60 is, at an outer end portion in the vehicle transverse direction, turnably connected to a lower end of the steering knuckle 58. The upper arm 62 is, at an outer end portion in the vehicle transverse direction, turnably connected to an upper end of the steering knuckle 58. The shock absorber 64 is, at a lower end portion (the wheel side), swingably connected to the lower arm 60. The compression coil spring 66 is provided in a compressed state between a vehicle body side and a wheel side at the shock absorber 64.

Further, as shown in FIG. 5, a lower arm supporting portion 50SL, an upper arm supporting portion 50SU, and an absorber supporting portion 50SA are provided in that order from the lower side at a side wall 50S of the suspension member 50. A vehicle transverse direction inner end of the lower arm 60 is connected to the lower arm supporting portion 50SL so as to be swingable in the up-down direction. A vehicle transverse direction inner end of the upper arm 62 is connected to the upper arm supporting portion 50SU so as to be swingable in the up-down direction. An upper end portion (the vehicle body side) of the shock absorber 64 is connected to the absorber supporting portion 50SA.

Due to the above, the left and right front suspension units 52 are assembled as entireties to the suspension member 50. Namely, each of the front suspension units 52 is supported at the suspension member 50 so as to function independently without relying on the other portions that structure the vehicle body of the automobile V.

Further, a steering device 68 is assembled to the suspension member 50. The steering device 68 is structured with main portions thereof being a steering gear box 70, a steering wheel 72, and an intermediate shaft 74. Tie rods 70T, that are provided at both ends in the vehicle transverse direction of the steering gear box 70, are connected to unillustrated knuckle arms at the steering knuckles 58. Note that the front suspension module 14 may be structured in a state in which the steering wheel 72 is not mounted thereto.

When steering force (assist force by a power steering device) of the steering wheel 72, that is transmitted via the intermediate shaft 74, is transmitted to the steering gear box 70, the steering gear box 70 displaces the tie rods 70T in the vehicle transverse direction in accordance with a direction of operation of that steering force. In this embodiment, the intermediate shaft 74 passes through an internal space (the dash lower portion 24) of the suspension member 50.

Figure 6:
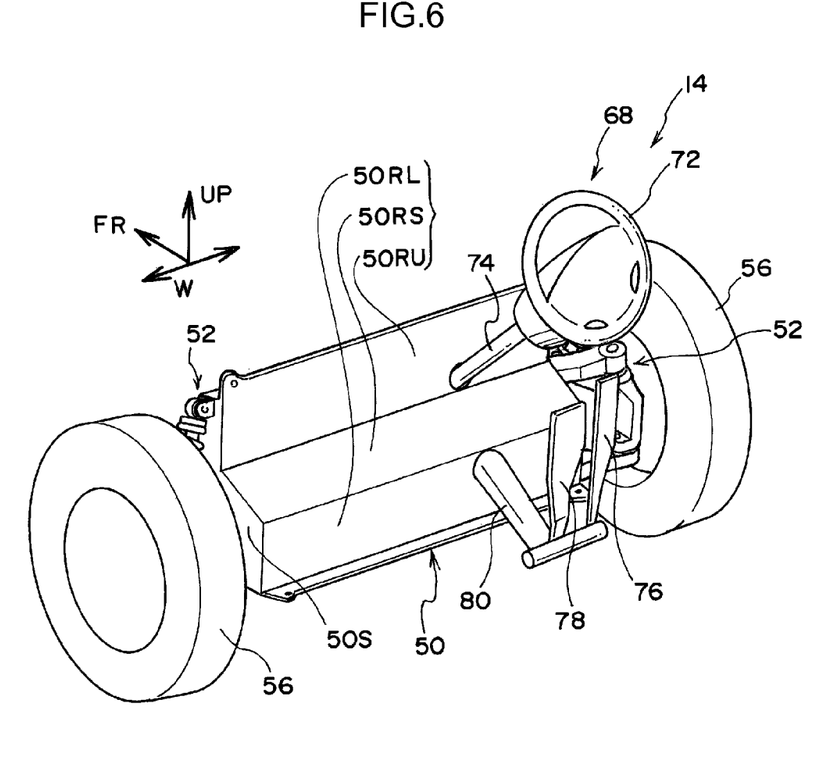
FIG. 6 is a perspective view viewing, from a reverse surface side, the front suspension module that structures the vehicle body lower portion structure relating to the embodiment of the present invention.

Moreover, an accelerator pedal 76 and a brake pedal 78 are assembled to the suspension member 50. As shown in FIG. 6, the accelerator pedal 76 and the brake pedal 78 are respectively supported so as to be able to rotate independently around an axis that runs along the vehicle transverse direction, via a stay 80 that projects-out rearward from the lower portion 50RL of the rear wall 50R. The accelerator pedal 76 and the brake pedal 78 are disposed (not illustrated) within a vehicle cabin C due to the stay 80 being inserted-through a window portion 24W (see FIG. 3) that is formed in the dash lower portion 24. This window portion 24W is closed (sealed) by the suspension member 50 that is assembled to the underbody 12.

(Structure of Front EA Member)

The front EA member 16 that serves as a load transmitting member is a large part length direction thereof is along the vehicle transverse direction. Concretely, the front EA member 16 has a length that runs along the vehicle transverse direction and that is substantially equal to the vehicle transverse direction length of the front wall 50F of the suspension member 50, i.e., the interval between the left and right front suspension units 52. The front EA member 16 in this embodiment is formed in a box shape (a substantially rectangular box shape) that opens rearward.

Namely, the front EA member 16 is formed in the shape of a box that is long in the vehicle transverse direction and that opens rearward, by a front plate 16H, a ceiling plate 16T, a bottom plate 16B, and a pair of left and right side plates 16S. The ceiling plate 16T, the bottom plate 16B, and the pair of left and right side plates 16S are each formed in a wavy plate shape as seen in front view. Note that reinforcing ribs may be provided at an interior of the front EA member 16, in accordance with required impact absorption performance. As the reinforcing ribs, vertical ribs, that extend from the ceiling plate 16T to the bottom plate 16B along the up-down direction, may be provided at the reverse surface of the front plate 16H, or horizontal ribs, that extend from the front plate 16H to (a vicinity of) the open end of the box along the front-rear direction, may be provided at at least one of the ceiling plate 16T and the bottom plate 16B. Further, L-shaped or U-shaped ribs, at which the aforementioned vertical ribs and at least one of the horizontal ribs at the top or the bottom are continuous, may be provided as the reinforcing ribs. Moreover, rectangular ribs, that are substantially the same shape as the side plates 16S as seen in side view, may be provided as the reinforcing ribs. One only of the reinforcing ribs may be provided, or plural reinforcing ribs may be provided so as to be apart in the vehicle transverse direction.

Further, flange 16F projects-out from a rear end of the front EA member 16. At the flange 16F that planarly-contacts the front wall 50F, the front EA member 16 is eventually fixed to the underbody 12 by being fastened together with the suspension member 50, i.e., the front suspension module 14, by the fastening structures 54. Note that the front EA member 16 may be structured so as to be fixed to the underbody 12 via the suspension member 50, in the same way as the structure that fixes the rear EA member 20 to the underbody 12 that is described later. In other words, the front EA member 16 may be structured so as to be fixed indirectly to the underbody 12 by being fixed to the suspension member 50 with fixing structures that are independent of the structures that fix the suspension member 50 to the underbody 12.

As shown in FIG. 1, the front EA member 16 is formed in a rectangular shape that is long in the front-rear direction as seen in side view. Namely, the front EA member 16 is a structure that extends from a vicinity of rear of a front bumper cover 82 to the suspension member 50. Due thereto, at the vehicle body lower portion structure 10, it is structured that a load that accompanies a front collision of the automobile V is transmitted to the underbody 12 in the order of the front EA member 16, the suspension member 50, the dash lower portion 24 (the front cross portion 32). Accordingly, the suspension member 50 that structures the front suspension module 14 corresponds to the load transmitting member in the present invention.

As shown in FIG. 1, the front EA member 16 is disposed so as to be offset upward with respect to the rockers 36 of the underbody 36. In other words, the centroid of the front EA member 16 is offset upward with respect to the centroid of the rockers 36. More concretely, the front EA member 16 is structured to include a portion that is positioned further at an upper side than an upper front end of the stepped portion 24S of the dash lower portion 24. On the other hand, an upper edges position in the up-down direction of the rockers 36 substantially coincides with a lower rear end of an upper wall 32U of the front cross portion 32.

The respective portions of the front EA member 16 in this embodiment are formed integrally of a resin material. A fiber-reinforced resin that contains reinforcing fibers such as, for example, carbon fibers, glass fibers, aramid fibers or the like, may be used as the resin material that structures the front EA member 16.

(Structure of Rear Suspension Module)

Figure 7:
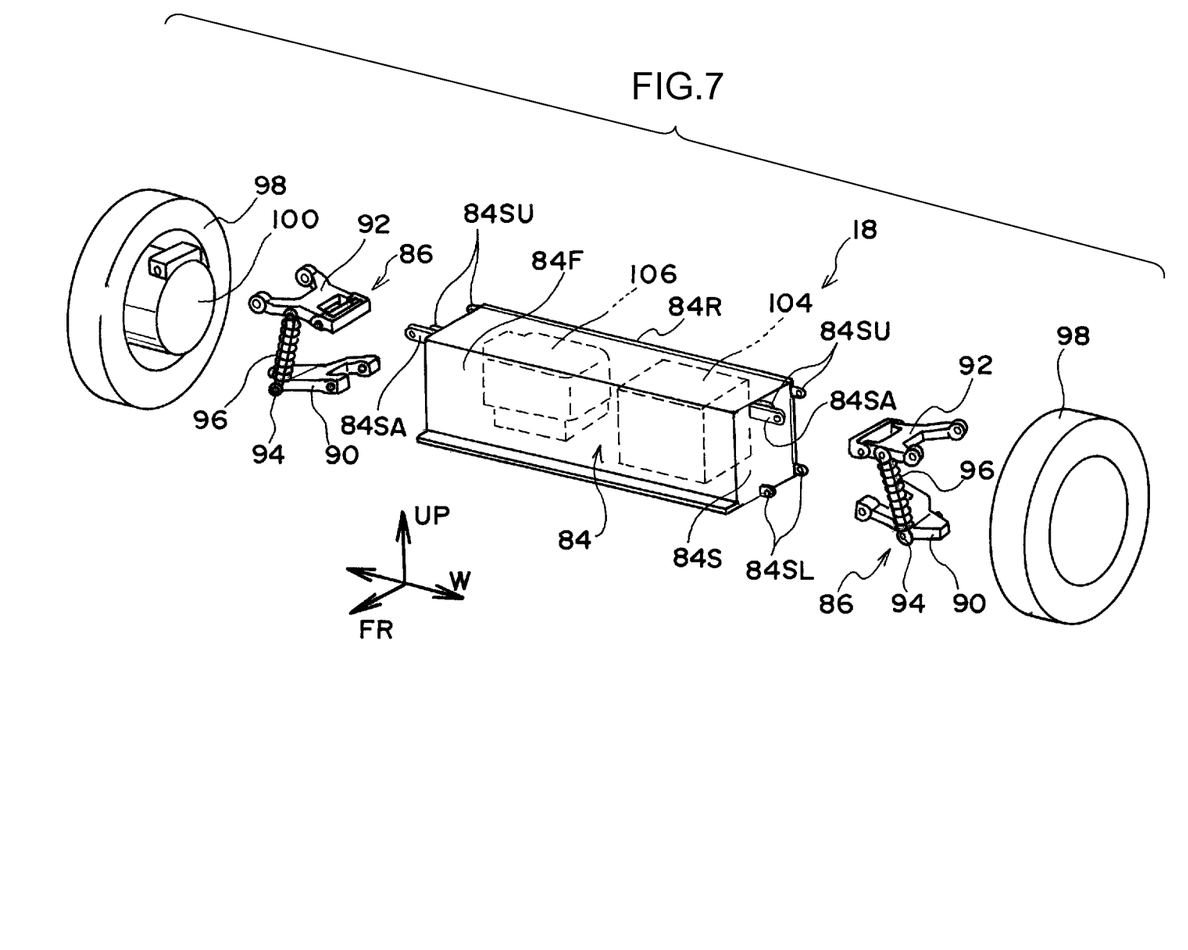
FIG. 7 is an exploded perspective view of a rear suspension module that structures the vehicle body lower portion structure relating to the embodiment of the present invention.

The rear suspension module 18 is structured to include at least a suspension member 84 and a pair of left and right rear suspension units 86. As shown in FIG. 3 and FIG. 7, the suspension member 84 that serves as a suspension supporting member has a length direction thereof that is along the vehicle transverse direction, and, as shown in FIG. 1, and the cross-section thereof orthogonal to the length direction is a closed cross-sectional structure.

A front wall 84F, that faces toward the front side, at the suspension member 84 is a flat wall that runs substantially in the up-down direction as seen in side view, in correspondence with the rear wall 34R of the rear cross portion 34 that structures the lower back portion 26. Further, an end surface 84R, that faces toward the rear side, at the suspension member 84 is a flat surface that runs substantially along the up-down direction as seen in side view. In this embodiment, the suspension member 84 is formed in a box shape that has a substantially rectangular (square) shape as seen in side sectional view.

The suspension member 84 is fixed to the underbody 12 in a state in which the front wall 84F planarly-contacts a rear wall 34R of the lower back portion 26. For example, fastening structures 88 in which bolts 88B are screwed from a front wall 84F side of the suspension member 84 with nut portions that are formed at collars 88C are employed as the fixing structure thereof. The collars 88C are made of metal and are provided at the lower back portion 26 (within the rear cross portion 34)

As shown in FIG. 3 and FIG. 7, the rear suspension units 86 that serve as suspension devices are mounted to side walls 84S of the suspension member 84. The rear suspension unit 86 is structured with main portions thereof being a lower arm 90, an upper arm 92, a shock absorber 94, and a compression coil spring 96. The lower arm 90 is, at an outer end portion in the vehicle transverse direction, connected so as to be swingable in the up-down direction to a lower portion of a wheel-in motor 100 that is incorporated within a rear wheel 98 that is a wheel. The upper arm 92 is, at an outer end portion in the vehicle transverse direction, connected so as to be swingable in the up-down direction to an upper portion of the wheel-in motor 100. The shock absorber 94 is, at a lower end portion (the wheel side), swingably connected to the lower arm 90. The compression coil spring 96 is provided in a compressed state between s vehicle body side and s wheel side at the shock absorber 94.

Further, lower arm supporting portions 84SL are provided at s lower end side of the side wall 84S of the suspension member 84, and upper arm supporting portions 84SU and an absorber supporting portion 84SA are provided at an upper end side. A vehicle transverse direction inner end of the lower arm 90 is connected to the lower arm supporting portions 84SL so as to be swingable in the up-down direction. A vehicle transverse direction inner end of the upper arm 92 is connected to the upper arm supporting portions 84SU so as to be swingable in the up-down direction. An upper end portion (a vehicle body side) of the shock absorber 94 is connected to the absorber supporting portion 84SA.

Due to the above, the left and right rear suspension units 86 are assembled as entireties to the suspension member 84. Namely, each of the rear suspension units 86 is supported at the suspension member 84 so as to function independently without relying on the other portions that structure the vehicle body of the automobile V.

Further, a battery 102 for driving the wheel-in motors 100, and a PCU (Power Control Unit 104) that is a control device, are assembled to the rear suspension module 18. Concretely, as shown in FIG. 7, the battery 102 and the PCU 104 are respectively incorporated within the suspension member 84 that is a closed cross-sectional (hollow) structural body. The wheel-in motors 100 are structures that are operated due to electric power of the battery 102 being supplied thereto from the PCU 104, and apply driving force to the rear wheels 98. Although not illustrated, wires between the wheel-in motors 100, the battery 102, and the PCU 104, and tubes for protecting these wires, and the like are assembled to the rear suspension module 18.

(Structure of Rear EA Member)

The rear EA member 20 that serves as a load transmitting member is a large part and a length direction thereof is along the vehicle transverse direction. Concretely, the rear EA member 20 has a length that runs along the vehicle transverse direction and that is substantially equal to a vehicle transverse direction length of the rear end surface 84R of the suspension member 84, i.e., an interval between the left and right rear suspension units 86. The rear EA member 20 in this embodiment is formed in a box shape (a substantially rectangular box shape) that opens forward.

Namely, the rear EA member 20 is formed in a box shape (a substantially rectangular box shape) that is long in the vehicle transverse direction and that opens forward, by a ceiling plate 20T, a bottom plate 20B, a pair of left and right side plates 20S, and a rear plate 20E. The ceiling plate 20T, the bottom plate 20B, and the pair of left and right side plates 20S are each formed in a wavy plate shape as seen in rear view. Note that reinforcing ribs may be provided at an interior of the rear EA member 20, in accordance with required impact absorption performance. As the reinforcing ribs, vertical ribs, that extend from the ceiling plate 20T to the bottom plate 20B along the up-down direction, may be provided at the front surface of the rear plate 20E, or horizontal ribs, that extend from the rear plate 20E to (a vicinity of) the open end of the box along the front-rear direction, may be provided at at least one of the ceiling plate 20T and the bottom plate 20B. Further, L-shaped or U-shaped ribs, at which the aforementioned vertical ribs and at least one of the horizontal ribs at the top or the bottom are continuous, may be provided as the reinforcing ribs. Moreover, rectangular ribs, that are substantially the same shape as the side plates 20S as seen in side view, may be provided as the reinforcing ribs. One only of the reinforcing ribs may be provided, or plural reinforcing ribs may be provided so as to be apart in the vehicle transverse direction.

Further, a flange 20F projects-out from a rear end of the rear EA member 20. At the flange 20F, the rear EA member 20 is fixed to the suspension member 84, i.e., the rear suspension module 18, by unillustrated fastening structures or adhesion or the like. In other words, the rear EA member 20 is fixed to the underbody 12 via the suspension member 84. Note that, in the same way as the above-described structures that fix the front EA member 16 to the underbody 12, the rear EA member 20 may be structured so as to be fixed to the underbody 12 by being fastened together with the suspension member 84 to the underbody 12 by common bolts in the suspension member 84. In other words, the rear EA member 20 may be a structure that is fixed to the underbody 12 by fixing structures that are common to the suspension member 84.

As shown in FIG. 1, the rear EA member 20 is formed in a rectangular shape (a square shape) as seen in side view. Namely, the rear EA member 20 is a structure that extends from a vicinity of front of a rear bumper cover 106 to the suspension member 84. Due thereto, at the vehicle body lower portion structure 10, it is structured that a load that accompanies a rear collision of the automobile V is transmitted to the underbody 12 in the order of the rear EA member 20, the suspension member 84, the lower back portion 26 (the rear cross portion 34). Accordingly, the suspension member 84 that structures the rear suspension module 18 corresponds to the load transmitting member in the present invention.

As shown in FIG. 1, the rear EA member 20 is disposed so as to be offset upward with respect to the rockers 36 of the underbody 12. In other words, the centroid of the rear EA member 20 is offset upward with respect to the centroid of the rockers 36. More concretely, the rear EA member 20 is positioned further at the upper side than the lower end of the front wall 34F of which the majority is an inclined wall, and portions of the rockers 36 that are positioned further at the upper side than the lower end of the front wall 34F are smaller as compared with that of the rear EA member 20. Note that a lower end of the rear EA member 20 and lower ends of the rockers 36 substantially coincide at positions in the up-down direction.

The respective portions of the rear EA member 20 in this embodiment are formed integrally of a resin material. A fiber-reinforced resin that contains reinforcing fibers such as, for example, carbon fibers, glass fibers, aramid fibers or the like, may be used as the resin material that structures the rear EA member 20.

Operation of the present embodiment is described next.

In the automobile V to which the vehicle body lower portion structure 10 having the above-described structure is applied, in accordance with operation of the accelerator pedal 76, electric power is supplied from the PCU 104 to the wheel-in motors 100, and the automobile V travels due to the driving force of the wheel-in motors 100. Further, at the automobile V, in accordance with operation of the brake pedal 78, the wheel-in motors 100 are made to function as generators, and electric power is recovered (regenerated) at the battery 102 via the PCU 104. Moreover, at the automobile V, in accordance with steering of the steering wheel 72, the steering gear box 70 drives the tie rods 70T, and the front wheels 56 are turned.

(Operation and Effects with Respect to a Front Collision)

When a front collision of this automobile V occurs, the front bumper cover 82 deforms, and collision load is inputted to the front EA member 16. Due to this load, the front EA member 16 is compressively deformed, and transmits load (supporting reaction force) to the suspension member 50 while absorbing the impact energy (dynamic load). The load that is transmitted to the suspension member 50 is transmitted to the left and right rockers 36 via the front cross portion 32 of the dash lower portion 24. Note that the white arrows in FIG. 1 and FIG. 2 show the path of transmission of the collision load that accompanies a front collision.

Here, in the vehicle body lower portion structure 10, the collision load that is inputted to the front EA member 16 is received at a wide surface of the suspension member 50 (the front wall 50F that is long in the vehicle transverse direction), and therefore, the front EA member 16 is axially compressively deformed stably. Namely, in a comparative example in which collision load is received (transmitted rearward) at a pair of left and right side members from a bumper reinforcement that is long in the vehicle transverse direction, load in a direction of folding-over the side members that are long in the front-rear direction is applied. Therefore, in the comparative example, many frame members or reinforcing members are needed in order to efficiently absorb the collision energy.

In contrast, in the vehicle body lower portion structure 10, the front EA member 16 is formed in the shape of a box that has the front plate 16H and that is open toward a suspension member 50 side. Therefore, the load that is inputted to this front EA member 16 is received at the front plate 16H. The load that is inputted to the front plate 16H is dispersed in the length direction of the front EA member 16 (the vehicle transverse direction), and is transmitted to a wide surface of the suspension member 50. Namely, the load that is inputted to the front plate 16H is received at a wide surface of the suspension member 50, while the entire rectangular frame-shaped portion, that is formed to include the ceiling plate 16T, the bottom plate 16B and the pair of side plates 16S, is compressed via this front plate 16H. In this way, at the vehicle body lower portion structure 10, the front EA member 16, as a primary load dispersing member, absorbs the collision energy while dispersing the load, that is received at the front plate 16H, in the vehicle transverse direction.

Therefore, it is difficult for folding-over, which may be happened at the side members in the comparative example, to arise at the front EA member 16 and the suspension member 50. Namely, as described above, the front EA member 16 is axially compressive deformed stably. Further, also with respect to a collision load that accompanies an offset collision or an oblique collision, the front EA member 16 disperses this load in the vehicle transverse direction and transmits the load to a wide surface of the suspension member 50, while compressing the rectangular frame-shaped portion on the whole via the front plate 16H. Namely, the front EA member 16 is axially compressively deformed also in cases of an offset collision or an oblique collision.

Note that, in a structure in which the aforementioned reinforcing ribs are provided within the front EA member 16, in the case of an offset collision or an oblique collision or the like, local deformation of the front EA member 16 (the ceiling plate 16T, the bottom plate 16B) in the vehicle transverse direction is suppressed more effectively by the reinforcing ribs. Therefore, the front EA member 16 disperses the load, that is inputted to the front plate 16H, more efficiently in the vehicle transverse direction, and, as a box shape (EA member) on the whole, can transmit the load to a wide surface of the suspension member 50.

Moreover, in the vehicle body lower portion structure 10, the load from the front EA member 16 is dispersed in the vehicle transverse direction at the suspension member 50, and is transmitted to the dash lower portion 24, i.e., the underbody 12. Namely, the suspension member 50, as a secondary load dispersing member, exhibits the function of transmitting load to the underbody 12. Therefore, in the vehicle body lower portion structure 10, the collision load at the time of an offset front collision or that accompanies an oblique collision also is received at a wide surface of the suspension member 50, and can be transmitted to a underbody 12 side while being efficiently dispersed in the vehicle transverse direction at this suspension member 50. Namely, in the above-described comparative example, the load at the time of an offset front collision or that is due to an oblique collision is apt to act in directions of folding-over the side members. In contrast, in the vehicle body lower portion structure 10, with respect to times of an offset front collision or oblique collisions as well, the load is dispersed in the vehicle transverse direction, and therefore, efficient load transmission toward the underbody 12 side is achieved.

Moreover, in the vehicle body lower portion structure 10, as described above, load is dispersed in the vehicle transverse direction and is transmitted to the underbody 12, and therefore, local deform at one portion in the vehicle transverse direction of the dash lower portion 24 of this underbody 12 is prevented or effectively suppressed. Therefore, an amount of local penetration (rearward retreating) of the dash lower portion 24 into the vehicle cabin C is decreased, and a deformation amount of the vehicle cabin C can be kept low also after a front collision. Further, as described above, the load, that is dispersed in the vehicle transverse direction by the suspension member 50 and is transmitted to the underbody 12 (the front cross portion 32), is transmitted substantially uniformly to the left and right rockers 36. Due thereto, non-uniform deformation of the vehicle cabin C is prevented or effectively suppressed.

Further, at the vehicle body lower portion structure 10, the stepped portion 50RS and the upper wall 32U (the stepped portion 24S) that are inclined walls are formed at the suspension member 50 and the front cross portion 32. Therefore, as shown in FIG. 1, load can be transmitted efficiently from the front EA member 16 toward the rockers 36, which front EA member 16 and rocker 36 are offset in the up-down direction from one another, as axial force of the inclined wall (while suppressing bending in the up-down direction of the suspension member 50 and the dash lower portion 24).

In this way, in the vehicle body lower portion structure 10 relating to the present embodiment, the load of a front collision, including an offset collision or an oblique collision, can be efficiently absorbed and dispersed, and transmitted to the underbody 12. Due to the above, in the vehicle body lower portion structure 10, the requisite energy absorption performance can be ensured without providing a frame member (a linking member) such as a side member or a bumper reinforcement. This contributes to a reduction in the manufacturing cost of the automobile V and a lightening of the weight of the vehicle, while ensuring the robustness with respect to front collision safety.

(Operation and Effects Due to Front Suspension Module)

Further, here, in the vehicle body lower portion structure 10, the suspension member 50, that is a highly rigid member that supports the front suspension units 52, is fixed to the underbody 12 in a state of planarly-contacting the dash lower portion 24 of the underbody 12. Therefore, the underbody 12 is reinforced by the suspension member 50, which contributes to an improvement in the rigidity of this underbody 12.

In particular, in the vehicle body lower portion structure 10, the suspension member 50 supports the entire front suspension units 52 that include the lower arms 60, the upper arms 62, the shock absorbers 64 and the compression coil springs 66. Therefore, load from the front wheels 56 is supported at the suspension member 50. Due thereto, as compared with a comparative example that has, for example, strut towers or the like that support the upper ends (the vehicle body sides) of the shock absorbers 64, reinforcement of the body side can be rendered unnecessary, which contributes to a further reduction in the manufacturing cost of the automobile V and a further lightening of the weight thereof.

Further, because the front suspension units 52 are assembled to the suspension member 50, the accuracy of assembly of the front suspension units 52, i.e., parts for wheels or the like, to the vehicle body (the underbody 12), and the workability of assembling, improve. In particular, at the vehicle body lower portion structure 10, the front suspension module 14 is structured by the front wheels 56, the steering device 68 (the steering gear box 70, the steering wheel 72, the intermediate shaft 74), the accelerator pedal 76 and the brake pedal 78 being assembled integrally to the suspension member 50. Therefore, all of the main operating systems in the vehicle body lower portion structure 10 are supported by the common suspension member 50, and the assembly position accuracy among the parts that structure these operating systems, and the workability of connecting (mainly, the mechanical connection of) the parts that structure the operating systems, and the workability of assembling the respective parts, that structure the operating systems, to the vehicle body, respectively improve.

(Operation and Effects with Respect to a Rear Collision)

Further, when a rear collision of the automobile V occurs, collision load is inputted to the rear EA member 20 due to deformation of the rear bumper cover 106. Due to this load, the rear EA member 20 is compressively deformed, and transmits the load that is based on a residual energy to the suspension member 84 while absorbing impact energy (dynamic load). The load that is transmitted to the suspension member 84 is transmitted to the left and right rockers 36 via the rear cross portion 34 of the lower back portion 26. Note that the arrows marked by hatching in FIG. 1 and FIG. 2 show the path of transmission of the collision load that accompanies a rear collision.

Here, in the vehicle body lower portion structure 10, the collision load that is inputted to the rear EA member 20 is received at a wide surface of the suspension member 84 (the rear wall 84R that is long in the vehicle transverse direction), and therefore, the rear EA member 20 is axially compressively deformed stably. Namely, in a comparative example in which collision load is received (transmitted forward) at a pair of left and right side members from a bumper reinforcement that is long in the vehicle transverse direction, load in the direction of folding-over the side members, that are long in the front-rear direction, is applied. Therefore, in the comparative example, many frame members or reinforcing members are needed in order to efficiently absorb the collision energy.

In contrast, in the vehicle body lower portion structure 10, the rear EA member 20 is formed in the shape of a box that has the rear plate 20E and that opens toward the suspension member 84 side, and therefore, the load inputted to this rear EA member 20 is received at the rear plate 20E. The load that is inputted to the rear plate 20E is dispersed in the length direction of the rear EA member 20 (the vehicle transverse direction), and is transmitted to a wide surface of the suspension member 84. Namely, the load inputted to the rear plate 20E is received at a wide surface of the suspension member 84, while compressing the entire rectangular frame-shaped portion that is formed to include the ceiling plate 20T, the bottom plate 20B, and the pair of side plates 20S, via the rear plate 20E. In this way, in the vehicle body lower portion structure 10, the rear EA member 20, as a primary load dispersing member, absorbs collision energy while dispersing, in the vehicle transverse direction, the load received at the rear plate 20H.

Therefore, it is difficult for folding-over, which may be happened at the side members of the comparative example, to arise at the rear EA member 20 and the suspension member 84. Namely, as described above, the rear EA member 20 is axially compressively deformed stably. Further, with regard to the collision load that accompanies an offset collision or an oblique collision as well, the rear EA member 20 disperses this load in the vehicle transverse direction and transmits the load to a wide surface of the suspension member 84, while compressing the rectangular frame-shaped portion on the whole via the rear plate 20H. Namely, in cases of an offset collision or an oblique collision as well, the rear EA member 20 is axially compressively deformed stably.

Note that, in a structure in which the aforementioned reinforcing ribs are provided within the rear EA member 20, in the case of an offset collision or an oblique collision or the like, local deformation of the rear EA member 20 (the ceiling plate 20T, the bottom plate 20B) in the vehicle transverse direction is suppressed more effectively by the reinforcing ribs. Therefore, the rear EA member 20 disperses the load, that is inputted to the rear plate 20H, more efficiently in the vehicle transverse direction, and, as a box shape (EA member) on the whole, can transmit the load to a wide surface of the suspension member 84.

Moreover, the load from the rear EA member 20 is dispersed in the vehicle transverse direction at the suspension member 84, and is transmitted to the lower back portion 26, i.e., the underbody 12. Namely, the suspension member 84, as a secondary load dispersing member, exhibits function of transmitting load to the underbody 12. Therefore, in the vehicle body lower portion structure 10, the collision load at the time of an offset rear collision or that accompanies an oblique collision also is received at a wide surface of the suspension member 84, and can be transmitted to an underbody 12 side while being efficiently dispersed in the vehicle transverse direction at this suspension member 84. The load at the time of an offset front collision or that is due to an oblique collision is apt to act in directions of folding-over the side members. In contrast, in the vehicle body lower portion structure 10, with respect to an offset rear collision or oblique collisions as well, the load is dispersed in the vehicle transverse direction, and therefore, efficient load transmission toward the underbody 12 side is achieved.

Moreover, in the vehicle body lower portion structure 10, as described above, load is dispersed in the vehicle transverse direction and is transmitted to the underbody 12, and therefore, local deform at a portion in the vehicle transverse direction of the lower back portion 26 of this underbody 12 is prevented or effectively suppressed. Therefore, an amount of local penetration (forward advancing) of the lower back portion 26 into a vehicle cabin C is decreased, and a deformation amount of the vehicle cabin C can be kept low also after a rear collision. Further, as described above, the load, that is dispersed in the vehicle transverse direction by the suspension member 84 and is transmitted to the underbody 12 (the rear cross portion 34), is transmitted substantially uniformly to the left and right rockers 36. Due thereto, non-uniform deformation of the vehicle cabin C is prevented or effectively suppressed.

Further, at the vehicle body lower portion structure 10, the front wall 34F that is an inclined wall is formed at the rear cross portion 34. Therefore, as shown in FIG. 1, load can be transmitted efficiently from the rear EA member 20 toward the rockers 36, which rear EA member 20 and rockers 36 are offset in the up-down direction from one another, as axial force of the inclined wall (while suppressing bending in the up-down direction of the rear cross portion 34).

In this way, in the vehicle body lower portion structure 10 relating to the present embodiment, the load of a rear collision, including an offset collision or an oblique collision, can be efficiently absorbed and dispersed, and transmitted to the underbody 12. Due to the above, in the vehicle body lower portion structure 10, the requisite energy absorption performance can be ensured without providing a frame member (a linking member) such as a side member or a bumper reinforcement. This contributes to a reduction in the manufacturing cost of the automobile V and a lightening of the weight of the vehicle, while ensuring the robustness with respect to rear collision safety.

(Operation and Effects Due to Rear Suspension Module)

Further, here, in the vehicle body lower portion structure 10, the suspension member 84, that is a highly rigid member that supports the rear suspension units 86, is fixed to the underbody 12 in a state of being face-to-face with the lower back portion 26 of the underbody 12. Therefore, the underbody 12 is reinforced by the suspension member 84, which contributes to an improvement in the rigidity of this underbody 12.

In particular, in the vehicle body lower portion structure 10, the suspension member 84 supports the entire rear suspension units 86 that include the lower arms 90, the upper arms 92, the shock absorbers 94 and the compression coil springs 96. Therefore, the load from the rear wheels 98 is supported at the suspension member 84. Due thereto, as compared with a comparative example that has, for example, strut towers or the like that support the upper ends (the vehicle body sides) of the shock absorbers 94, reinforcement of the body side can be rendered unnecessary, which contributes to a further reduction in the manufacturing cost of the automobile V and a further lightening of the weight thereof.

Further, because the rear suspension units 86 are assembled to the suspension member 84, the accuracy of assembly of the rear suspension units 86, i.e., the parts around the wheels, to the vehicle body (the underbody 12), and the workability of assembling, improve. In particular, at the vehicle body lower portion structure 10, the rear suspension module 18 is structured by the rear wheels 98, the wheel-in motors 100, the battery 102 and the PCU 104 being assembled integrally to the suspension member 84. Therefore, all of the main driving systems of the vehicle body lower portion structure 10 are supported by the common suspension member 84. Due thereto, the assembly position accuracy among the parts that structure these driving systems, and the workability of connecting (including the mechanical and electrical connections of) the parts that structure the driving systems, and the workability of assembling the respective parts, that structure the driving systems, to the vehicle body, respectively improve.

(Modified Examples)

Note that the above-described embodiment illustrates an example in which the front EA member 16 side at the suspension member 50 is a wide, flat surface, but the present invention is not limited to this. For example, there can be made to be a modified example such as shown in FIG. 9 or FIG. 10.

Figure 9:
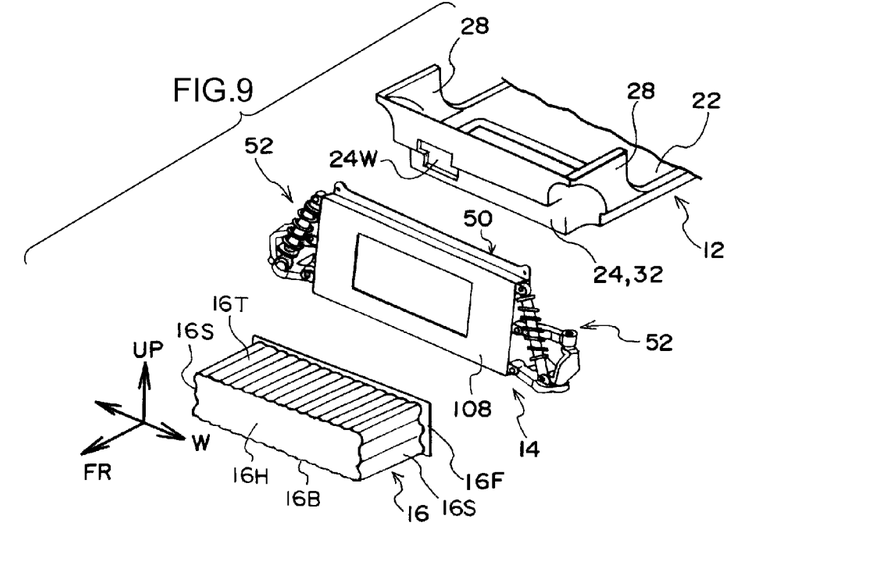
FIG. 9 is a perspective view showing a first modified example of the front suspension module that structures the vehicle body lower portion structure relating to the embodiment of the present invention.

The suspension member 50, that relates to a first modified example and is shown in FIG. 9, has, instead of the front wall 50F that is rectangular in front view, a frame-shaped wall 108 that is formed in a rectangular frame shape in front view. The flange 16F of the front EA member 16 contacts the frame-shaped wall 108 over the entire periphery.

Figure 10:
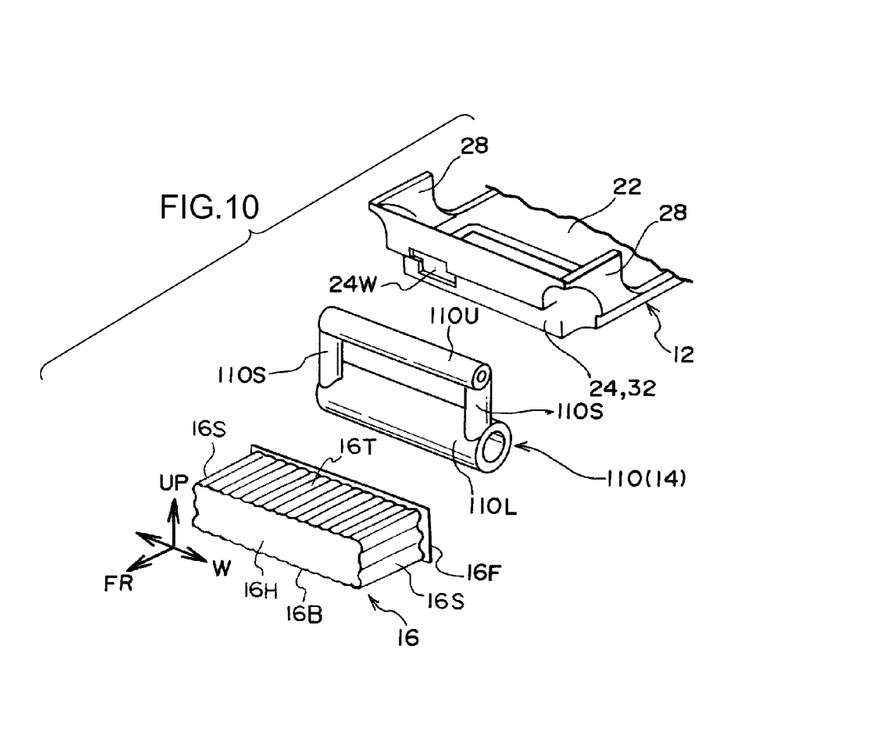
FIG. 10 is a perspective view showing a second modified example of the front suspension module that structures the vehicle body lower portion structure relating to the embodiment of the present invention.

In a second modified example shown in FIG. 10, instead of the suspension member 50, there is provided a suspension member 110 that is formed in a rectangular frame shape overall. Note that, in FIG. 10, illustration of the front suspension unit 52 is omitted.

At the suspension member 110, an upper cross portion 110U, a lower cross portion 110L, and a pair of left and right side portions 110S are respectively formed of pipe-shaped members (pipe materials). The upper cross portion 110U linearly-contacts the upper portion 24U of the dash lower portion 24 along the vehicle transverse direction, and the lower cross portion 110L contacts the lower portion 24L of the dash lower portion 24 along the vehicle transverse direction. In this embodiment, the upper cross portion 110U, 110L linearly-contacts the upper portion 24U, 24L of the dash lower portion 24 over the entire length in the vehicle transverse direction.

Further, in this embodiment, due to the lower cross portion 110L being structured of a pipe material of a larger diameter than the upper cross portion 110U, the front end positions in the front-rear direction of the upper cross portion 110U and the lower cross portion 110L substantially coincide. Note that, in a structure in which the dash lower portion 24 does not have the stepped portion 24S, the upper cross portion 110U and the lower cross portion 110L can be structured of pipe materials of the same diameter.

The flange 16F of the front EA member 16 contacts the above-described suspension member 110 over the entire periphery.

In accordance with the structures relating to the above-described respective modified examples as well, similar operations and effects can be obtained by structures that are basically similar to that of the above-described embodiment.

Note that, although the above-described embodiment illustrates a structure in which load transmitting members (the suspension members 50, 84) and impact absorbing members (the front and rear EA members 16, 20) are provided at the front and rear of the underbody 12, the present invention is not limited to this. For example, there may be a structure in which the present invention is applied to only one of the front side and the rear side of the underbody 12.

Further, the above-described embodiment illustrates an example in which the load transmitting members are the suspension members 50, 84 that support the suspension unit 52, the suspension unit 86 as a whole. However, the present invention is not limited to this. For example, the suspension members 50, 84 may be structures that support only the lower arms 60, 90, or the suspension members 50, 84 may be structures that support the lower arms 60, 90 and the upper arms 62, 92. Further, for example, the load transmitting member of the present invention may be a part that is independent from the front suspension unit 52, the rear suspension unit 86.

Moreover, the above-described embodiment illustrates an example in which the underbody 12, the front EA member 16, and the rear EA member 20 are formed from resin materials, but the present invention is not limited to this. For example, some of or all of each of the underbody 12, the front EA member 16, and the rear EA member 20 may be structured of a material such as a metal or the like, or may be structured of a composite material of metal and resin, or the like.

Still further, the above-described embodiment illustrates an example in which the front EA member 16 and the rear EA member 20 are formed in box shapes having the front plate 16H and the rear plate 20E, but the present invention is not limited to this. For example, there may be a structure that is provided with, instead of the front plate 16H, one or plural intermediate horizontal walls that span the pair of side plates 16S between the ceiling plate 16T and the bottom plate 16B, or, for example, there may be a structure that is provided with, instead of the rear plate 20E, an "X"-shaped plate (brace) that spans opposite corners of a rectangular frame that is structured by the ceiling plate 20T, the bottom plate 20B, and the pair of side plates 20S as seen in rear view. Note that there may be a structure in which this intermediate horizontal wall or "X"-shaped plate is provided as a reinforcing rib together with the front plate 16H and the rear plate 20E.

Further, the present invention is not limited to the above-described embodiment and respective modified examples, and can be embodied by being modified in various ways within a scope that does not deviate from the gist thereof.

The invention claimed is:

1. A vehicle body lower portion structure comprising:
    an underbody at which standing walls are provided to stand upward in a vehicle up-down direction from both ends in a vehicle front-rear direction at a floor portion, wherein the standing walls have a longitudinal direction thereof along a vehicle transverse direction;
    a load transmitting member, a length direction thereof being along the vehicle transverse direction and a cross-section thereof orthogonal to the length direction being a closed cross-sectional structure, is joined to the underbody in a state that a flat surface of the load transmitting member planarly-contacting a surface that faces outward in the vehicle front-rear direction of at least one of the standing walls; and
    an impact absorbing member, a length direction thereof being along the vehicle transverse direction is formed in a box shape and opens toward a load transmitting member side and is closed at an opposite side in the vehicle front-rear direction to the load transmitting member side, the impact absorbing member is joined, at a flange that projects-out from an open end thereof, in a planarly-contacting state to a flat surface at an opposite side in the vehicle front-read direction to an underbody side of the load transmitting member.

2. The vehicle body lower portion structure of claim 1, wherein at least a portion of the load transmitting member is structured by a suspension supporting member that supports, at outer end sides in the vehicle transverse direction of the suspension supporting member, at least a portion of suspension devices that suspend wheels.

3. The vehicle body lower portion structure of claim 2, wherein the load transmitting member is the suspension supporting member that is structured so as to be able to be mounted to the underbody while supporting the suspension devices as entireties.

4. The vehicle body lower portion structure of claim 1, wherein
    a front-rear direction frame portion, a length direction thereof being along the vehicle transverse direction and forming a closed cross-section as seen from the vehicle transverse direction, is provided at least at a lower end side in the vehicle up-down direction of the standing wall of the underbody, the closed cross-sectional portion is connected to the front-rear direction frame portion at an end portion thereof at a side where, in the vehicle front-rear direction, the load transmitting member and the impact absorbing member are provided;
    the impact absorbing member is disposed so as to be offset at an upper side in the vehicle up-down direction with respect to the front-rear direction frame portion; and
    at least one of the closed cross-sectional portion and the load transmitting member has an inclined portion that is inclined such that a lower side thereof in the vehicle up-down direction is positioned at the front-rear direction frame portion side than an upper side thereof in the vehicle front-rear direction.

* * * * *